US012583337B2

(12) United States Patent
Bäder et al.

(10) Patent No.: US 12,583,337 B2
(45) Date of Patent: Mar. 24, 2026

(54) ENERGY STORAGE DEVICE FOR A MOTOR VEHICLE, MOTOR VEHICLE AND METHOD FOR PRODUCING AN ENERGY STORAGE DEVICE

(71) Applicant: AUDI AG, Ingolstadt (DE)

(72) Inventors: Dirk Bäder, Fellbach (DE); Michael Grabowski, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 305 days.

(21) Appl. No.: 18/356,400

(22) Filed: Jul. 21, 2023

(65) Prior Publication Data

US 2024/0059162 A1 Feb. 22, 2024

(30) Foreign Application Priority Data

Aug. 17, 2022 (DE) .......................... 102022120726.9

(51) Int. Cl.
B60L 50/64 (2019.01)
B60L 50/60 (2019.01)
(52) U.S. Cl.
CPC .............. B60L 50/64 (2019.02); B60L 50/66 (2019.02)
(58) Field of Classification Search
CPC ................................. B60L 50/64; B60L 50/66
USPC ........................................................ 180/68.5
See application file for complete search history.

(56) References Cited

U.S. PATENT DOCUMENTS

| | | | | | |
|---|---|---|---|---|---|
| 11,177,525 | B2 * | 11/2021 | Fan | ..................... | H01M 50/271 |
| 11,909,059 | B2 * | 2/2024 | Chen | ........................ | C09K 5/14 |

| | | | | | |
|---|---|---|---|---|---|
| 2002/0164441 | A1 * | 11/2002 | Amine | .................. | B32B 15/043 |
| | | | | | 428/35.2 |
| 2016/0126535 | A1 * | 5/2016 | Qiao | .................. | H01M 10/0481 |
| | | | | | 29/623.5 |
| 2016/0226042 | A1 * | 8/2016 | Hartmann | ........... | H01M 50/213 |
| 2016/0226114 | A1 * | 8/2016 | Hartmann | .......... | C08G 18/7671 |
| 2017/0314835 | A1 | 11/2017 | Howland et al. | | |
| 2018/0292020 | A1 * | 10/2018 | Kleinke | ................ | F16K 31/126 |
| 2019/0326571 | A1 * | 10/2019 | Wuensche | ............. | H01M 50/24 |
| 2020/0122589 | A1 * | 4/2020 | Thurmeier | .......... | H01M 50/209 |
| 2020/0373525 | A1 * | 11/2020 | Pfeiff | .................... | H01M 50/24 |
| 2021/0111386 | A1 * | 4/2021 | Kellner | .................. | B60L 50/64 |
| 2022/0059893 | A1 * | 2/2022 | Fan | ..................... | H01M 10/613 |
| 2022/0223934 | A1 | 7/2022 | Lee | | |

FOREIGN PATENT DOCUMENTS

| | | | |
|---|---|---|---|
| DE | 102009052508 | A1 | 5/2011 |
| DE | 102012220400 | A1 | 5/2014 |
| DE | 102020104650 | A1 | 8/2021 |

(Continued)

OTHER PUBLICATIONS

Search Report issued on Feb. 20, 2023, in corresponding German Application No. 102022120726.9, 16 pages.

*Primary Examiner* — Hau V Phan
(74) *Attorney, Agent, or Firm* — Maier & Maier, PLLC

(57) ABSTRACT

An energy storage device for a motor vehicle with a protective device for protecting at least one battery cell of the energy storage device. The energy storage device includes at least one component made of a plastic material. The component is part of the protective device and the plastic material comprises a superabsorbent material, so that the at least one component is designed to absorb liquid. The component is also assigned an additional function that differs from the absorption of liquid.

20 Claims, 2 Drawing Sheets

(56) References Cited

FOREIGN PATENT DOCUMENTS

| | | | |
|----|------------|----|---------|
| EP | 1332169    | B1 | 12/2016 |
| WO | 2019016075 | A1 | 1/2019  |
| WO | 2022092764 | A1 | 5/2022  |

\* cited by examiner

ENERGY STORAGE DEVICE FOR A MOTOR VEHICLE, MOTOR VEHICLE AND METHOD FOR PRODUCING AN ENERGY STORAGE DEVICE

FIELD

The invention relates to an energy storage device for a motor vehicle with a protective device for protecting at least one battery cell of the energy storage device, the energy storage device comprising at least one component made of a plastic material. Furthermore, the invention also relates to a motor vehicle with such an energy storage device and a method for producing an energy storage device.

BACKGROUND

Energy storage devices for motor vehicles, in particular high-voltage batteries, should ideally be very well protected against the penetration of liquid into the battery housing, since short circuits can otherwise occur. In order to increase safety in connection with such energy storage devices, it is also known to introduce superabsorbent material into such a high-voltage battery in order to bind water.

For example, DE 10 2020 104 650 A1 describes an energy storage device with an energy storage component, which is arranged in a volume delimited by a housing element, in which an absorption element with an absorbent is also arranged, which is designed to absorb the liquid, when an electrically conductive liquid is present in the volume. The absorbent may comprise a superabsorbent.

The provision of such absorption elements requires additional space. It is also conceivable to introduce superabsorbent material into a specific component by filling cavities. This also requires a certain amount of space. In addition, there is always an additional weight associated with the provision of such absorption elements. A superabsorbent material can often be provided and introduced in the form of fine granules, but this has the disadvantage that granules trickle and are therefore difficult to hold in a specific position.

Furthermore, water-absorbing polymer structures can also be integrated into a composite, as disclosed in DE 10 2012 220 400 A1. For this purpose, a fiber fleece can be coated with a water-absorbing polymer structure and then covered with another fiber fleece. Such a composite can be provided as an additional sheathing layer for a cable. In this case, too, additional installation space is required and additional weight is created.

SUMMARY

The object of the present invention is to provide an energy storage device for a motor vehicle, a motor vehicle and a method that allow the protection of an energy storage device to be increased, and this in the most space-saving and weight-saving manner possible.

This object is achieved by an energy storage device, a motor vehicle and a method with the features according to the respective independent claims. Advantageous embodiments of the invention are the subject matter of the dependent claims, the description, and the figures.

The invention relates to an energy storage device for a motor vehicle with a protective device for protecting at least one battery cell of the energy storage device, wherein the energy storage device comprises at least one component made of a plastic material. The component is part of the protective device and the plastic material comprises a superabsorbent material, so that the at least one component is designed to absorb liquid, wherein the component also being assigned an additional function that differs from the absorption of liquid.

The invention is based on the finding that superabsorbent materials, some of which are simply referred to below as super absorbers, are normally "hard" plastic structures in the absence of water. Only when they come into contact with water do the super absorbers begin to swell and lose their mechanical stability. This advantageously makes it possible to use such superabsorbent materials as part of engineering plastics materials, or to form such an engineering plastic from the super absorber and use it to produce any desired plastic component within the energy storage device. In the normal operating state of the energy storage device, namely when the superabsorbent material is not in contact and is not saturated with liquid, such a component can then take on a specific function which is different from absorbing liquid. In other words, plastic components used or arranged in an energy storage device can be manufactured or used as before, except that they are now not manufactured from a conventional plastic material, but at least partially comprise a superabsorbent material. In the normal state, namely when no liquid is being absorbed by the component, the normal function of these components, which is referred to here as an additional function, is also not impaired by the superabsorbent material content. In addition, however, the formation of such a component at least partially from superabsorbent material has the great advantage that in the event of a fault in which, for example, liquid penetrates into the energy storage device, this liquid can be at least partially absorbed by the component. The component can also reduce humidity. The invention thus advantageously allows superabsorbent materials to be introduced into an energy storage device without causing additional weight or requiring additional installation space, since such superabsorbent materials can be introduced synergistically in a part via plastic construction materials and not as a separate additional component. This entails an enormous weight and package saving. A further advantage is that the introduced superabsorbent material, as described, can reduce the humidity within the energy storage device and, in addition, any water that may have penetrated in the event of leaks can be absorbed. In this way, the safety of the energy storage device can be significantly increased, specifically in a particularly space-efficient and weight-saving manner.

A superabsorbent material can in particular be understood to mean a super absorber polymer or a superabsorbent polymer. In general, super absorbers are water-insoluble, crosslinked polymers that are capable of absorbing large amounts of water, aqueous liquids or the like, by swelling and forming hydrogels, and retaining them under pressure. For example, super absorbers can absorb at least 100 times their own weight in water.

The energy storage device is preferably designed as a high-voltage energy storage device, in particular as a high-voltage battery. In general, such an energy storage device can have a battery housing with a plurality of battery cells arranged therein. These can optionally be combined into battery modules. The high-voltage energy storage device can comprise, for example, multiple battery modules each having multiple battery cells. The battery cells can be formed as lithium-ion cells, for example. The modules can also have their own module housing. In principle, the component that comprises the super absorber as a structural material can be designed as part of those components mentioned or numerous other components that are present in such an energy storage device and are made of a plastic material. Examples of this are, for example, covers, cable routing parts, construction structures, cable ties, jackets, and so on. Other components will be explained in more detail later.

In a further advantageous embodiment of the invention, the plastic material is provided as an integral connection of the superabsorbent material with at least one plastic material different from a superabsorbent material, in particular in the form of a homogeneous material mixture. The combination with at least one other plastic material is very advantageous, since this allows the component to be provided with the desired properties in a simple manner. Such properties relate, for example, to the thermal conductivity of the component, the electrical conductivity of the component, mechanical properties of the component, temperature stability of the component, the creep behavior of the component, the swelling behavior in contact with water, and so on. All of these properties can be adjusted in a targeted manner by mixing plastic material with at least one other plastic material. The component can thus be provided with the properties suitable for performing the additional function and at the same time additionally provided with water-absorbing or, in general, liquid-absorbing properties, without additionally requiring additional installation space or weight for this purpose. Depending on the plastic mixture, the component can be designed, for example, as a dimensionally stable, rigid component, or also as a bendable or elastically deformable or compressible component or the like.

The plastic material can comprise at least one plastic material that is different from a superabsorbent material and can represent a polymer blend or a polymer alloy. In this way, an integral connection between different plastic materials, including the superabsorbent material, can advantageously be provided. As a result, the plastic material can be provided in a particularly simple manner, for example with homogeneous material properties, which is advantageous for many components. Nevertheless, a form-fitting mixing of different plastic components to provide the plastic material, including the superabsorbent material, would also be conceivable.

In principle, the superabsorbent material and the at least one other plastic material can be mixed in different ways or form a connection on a microscopic level. In particular, the polymer chains of the superabsorbent material and the polymer chains of the at least one other plastic material can twist or tangle with one another without entering into an integral connection at the microscopic level, or they can integrally connect to form common polymer chains, so that a single polymer chain of the plastic material of the component then has, for example, a portion that is provided by a polymer chain of the superabsorbent material and a portion that is provided by a polymer chain of the further plastic material. This is the case, for example, of a copolymer.

In addition, it can also be provided that the plastic material comprises a fiber-reinforced plastic, in particular comprising reinforcing fibers that are provided as glass fibers and/or carbon fibers. As a result, the plastic material can be provided with particularly high strength properties, for example with a particularly high tensile strength, making the plastic material particularly suitable for providing, for example, a tensioning strap for bracing a cell stack of the energy storage device as the component. However, the design as a fiber-reinforced plastic material is also very advantageous for numerous other components in the energy storage device.

In a further advantageous embodiment of the invention, the plastic material is provided entirely by the superabsorbent material. Although less preferred, it is nevertheless possible to produce or provide the entire component from the superabsorbent material. As a result, a component having a very large liquid absorbing capacity can be provided. This is advantageous if there are no other major requirements for the additional function to be fulfilled by the component and the component's only function is that of a cover or the like, for example.

In a further advantageous embodiment of the invention, the at least one component is designed as an injection molded component and/or deep-drawn component and/or 3D printed component and/or pressed component. In other words, the engineering plastic material provided using the superabsorbent material can advantageously be used to form or produce any components in an injection molding process or by means of a deep-drawing process or by means of 3D printing or by means of pressing, in particular hot extrusion, or by means of any other manufacturing process. Almost any plastic component can thus be manufactured in a particularly simple manner and provided with liquid-absorbing properties.

In a further advantageous embodiment of the invention, the energy storage device comprises a plurality of battery cells, wherein the component is arranged between at least two of the battery cells as a cell separating element, in particular wherein the battery cells are arranged next to one another in a stacking direction to form a cell stack and the energy storage device comprises a plurality of the components, wherein one of the components is arranged as a cell separating element between every two of the battery cells arranged adjacent in the stacking direction.

This configuration is particularly advantageous since the component as a cell separating element allows a particularly high protective function to be achieved through the additional liquid-absorbing properties of the component. A cell separating element can generally fulfill a plurality of functions. In particular, such a cell separating element is designed, for example, to electrically and also thermally insulate from one another the battery cells between which it is arranged. Such a cell separating element can also be designed to be at least partially deformable or compressible, in particular elastically deformable, in order to be able to absorb the tensile and swelling forces of the cells. If such a cell separating element comes into contact with this liquid, for example if liquid undesirably enters the energy storage device, the cell separating element comprising the super absorber can now absorb this liquid, at least partially, and swells in the process. Due to the swelling, the cell separating element loses its structural rigidity and can press itself into the smallest cracks and gaps. This "water cushion" between the cells can then serve as an additional thermal barrier between the cells, which is particularly advantageous in the event of a thermal runaway of a battery cell. Especially in the event of a fault, such cell separation elements with the superabsorbent material then ensure that a possible thermal propagation within the energy storage device can be stopped.

In a further advantageous embodiment of the invention, the energy storage device has at least one of the following components and the component part is designed as at least a part of at least one of the following listed components: a battery housing, in which a plurality of battery cells, in particular a plurality of battery modules, each with a plurality of battery cells, is arranged, a module housing of a battery module, in which a plurality of battery cells comprised by the energy storage device are arranged, a tensioning device for tensioning a cell stack, comprised by the battery module, of a plurality of battery cells stacked in a stacking direction, at least one of two end plates of the tensioning device and/or a tensioning strap of the tensioning device, which embraces the end plates together with the cell stack, a housing of an electronic component, which is arranged on one of the end plates of the module housing, a housing of another electronic component, a component housing that differs in particular from the battery housing and from the module housing, in particular a component housing of a sensor, an electrical and/or other electronic component, a holder or a handle, in particular on one or more battery modules, a cable holder or a cable tie and/or cable routing parts and/or a cable sheathing enclosing a plurality of cables, a fastening element, a protection against accidental contact, in particular on a live component, such as on a cell connector that electrically connects battery cells to one another, and/or on a pole terminal of a battery cell and/or on a module connector for the electrical connection of two battery modules, a cover, in particular a protective cover, a spacer, a cladding component, a battery switching unit or a battery junction box, or an insulating element for electrically insulating a first component from an environment or from a second component, in particular wherein the first component is a cell pole or a cell connector or a module connector, and the second component is an electrically conductive component, in particular a part of the battery housing or of a cooling device or similar.

There are thus advantageously numerous possibilities available for integrating a superabsorbent material as an engineering plastic material into one or more or all of these components mentioned, or also for integrating them as structural parts into other components that are not explicitly mentioned in the present case. This opens up numerous possible uses.

Accordingly, it represents a further advantageous embodiment of the invention if the additional function assigned to the at least one component represents at least one of the following: an electrically insulating function, a protective function, an enclosing function, a holding or stabilizing function, the function of providing a minimum distance between two components of the energy storage device to each other, a function of a cell separation between two battery cells, in particular spatially, electrically and thermally, a fastening and/or fixing function, a covering function.

In principle, this additional function can also be referred to as the primary function of the component, while the liquid-absorbing function can be referred to as an additional function. The component therefore primarily serves a purpose other than absorbing liquid in the energy storage device. Apart from the possible absorption or reduction of the humidity in the energy storage device, the component only takes on this liquid-absorbing function in exceptional cases or emergencies. The component is normally intended for a different main purpose. This makes the integration of the super absorber into the engineering material of this component particularly efficient, since neither additional installation space nor additional weight is required to integrate this additional liquid-absorbing function into a component, which in any case is only used very rarely if at all, while the safety of the energy storage can be significantly increased.

Furthermore, the invention also relates to a motor vehicle having an energy storage device according to the invention or one of its embodiments.

Furthermore, the invention also relates to a method for producing an energy storage device with a protective device for at least one battery cell of the energy storage device, wherein the energy storage device is produced with at least one component made of a plastic material. The at least one component is produced as part of the protective device from a plastic material, which comprises a superabsorbent material, so that the at least one component is designed to absorb liquid, wherein the component also being assigned an additional function that differs from the absorption of liquid.

The advantages described for the energy storage device according to the invention and its embodiments thus apply similarly to the method according to the invention.

The invention also includes developments of the method according to the invention, which comprise features as have already been described in conjunction with the developments of the energy storage device according to the invention. For this reason, the corresponding developments of the method according to the invention are not described again here.

The motor vehicle according to the invention is preferably designed as an automobile, in particular as a passenger car or truck, or as a passenger bus or motorcycle.

The invention also comprises the combinations of the features of the described embodiments. The invention thus also comprises implementations each comprising a combination of the features of a plurality of the described embodiments, provided that the embodiments were not described as mutually exclusive.

BRIEF DESCRIPTION OF THE FIGURES

Exemplary embodiments of the invention are described hereinafter. In particular.

DETAILED DESCRIPTION

Figure 1:
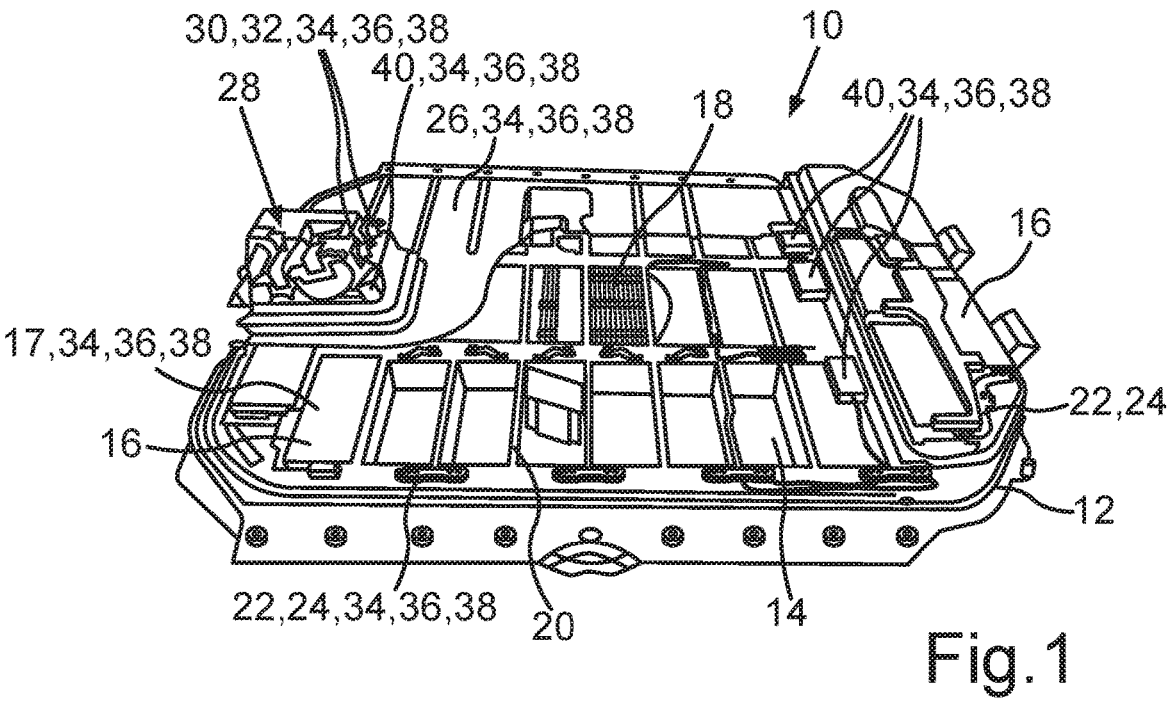
FIG. 1 shows a schematic representation of an energy storage device according to an exemplary embodiment of the invention.

The exemplary embodiments explained hereinafter are preferred embodiments of the invention. In the exemplary embodiments, the described components of the embodiments each represent individual features of the invention to be considered independently of one another, which each also develop the invention independently of one another. Therefore, the disclosure is also intended to comprise combinations of the features of the embodiments other than those represented. Furthermore, the described embodiments can also be supplemented by further ones of the above-described features of the invention.

In the figures, same reference numerals respectively designate elements that have the same function.

FIG. 1 shows a schematic illustration of an energy storage device 10 according to an exemplary embodiment of the invention. The energy storage device 10 is in the form of a high-voltage battery 10. Furthermore, FIG. 1 shows the energy storage device 10 in an only partially assembled state. In this case, the energy storage device 10 has a battery housing 12 which in turn provides a plurality of receiving regions 14 for receiving battery modules 16. A battery module 16 in turn includes a plurality of battery cells 18. For reasons of clarity, only some of the cells 18, the battery modules 16 and the receiving regions 14 are provided with a reference numeral. The receiving regions 14 are further separated from one another by partition walls 20 of the housing 12. The battery modules 16 are electrically connected to one another via module connectors 22, of which only the insulation 24 electrically isolating the module connectors 22 as protection against accidental contact are shown in FIG. 1. A cover 26 is also arranged on the battery modules 16, which cover is presently also only partially mounted. The energy storage device 10 also comprises a battery switching unit 28 with the high-voltage connections 30, of which only the contact protection 32 encasing the same can also be seen here.

Also, for reasons of clarity, only some of the module connectors 22 or their electrical insulation 24 are provided with a reference numeral.

The battery modules 16 are also provided with a cover 17 on the upper side. There are thus numerous components 34 in an energy storage device 10 which are made of plastic material 36, wherein this plastic material 36 preferably comprises a superabsorbent material 38. In other words, such a superabsorbent material 38 or a super absorber polymer should be part of the engineering plastic material 36, from which these components 34 are made. These components 34 can be, for example, the cover 17 of the battery modules 16, the contact protection 24 of the module connectors, the top cover 26, the contact protection 32 of the high-voltage connections 30, and so on. Such components 34 can also represent housings 40 of electrical or electronic components.

Figure 2:
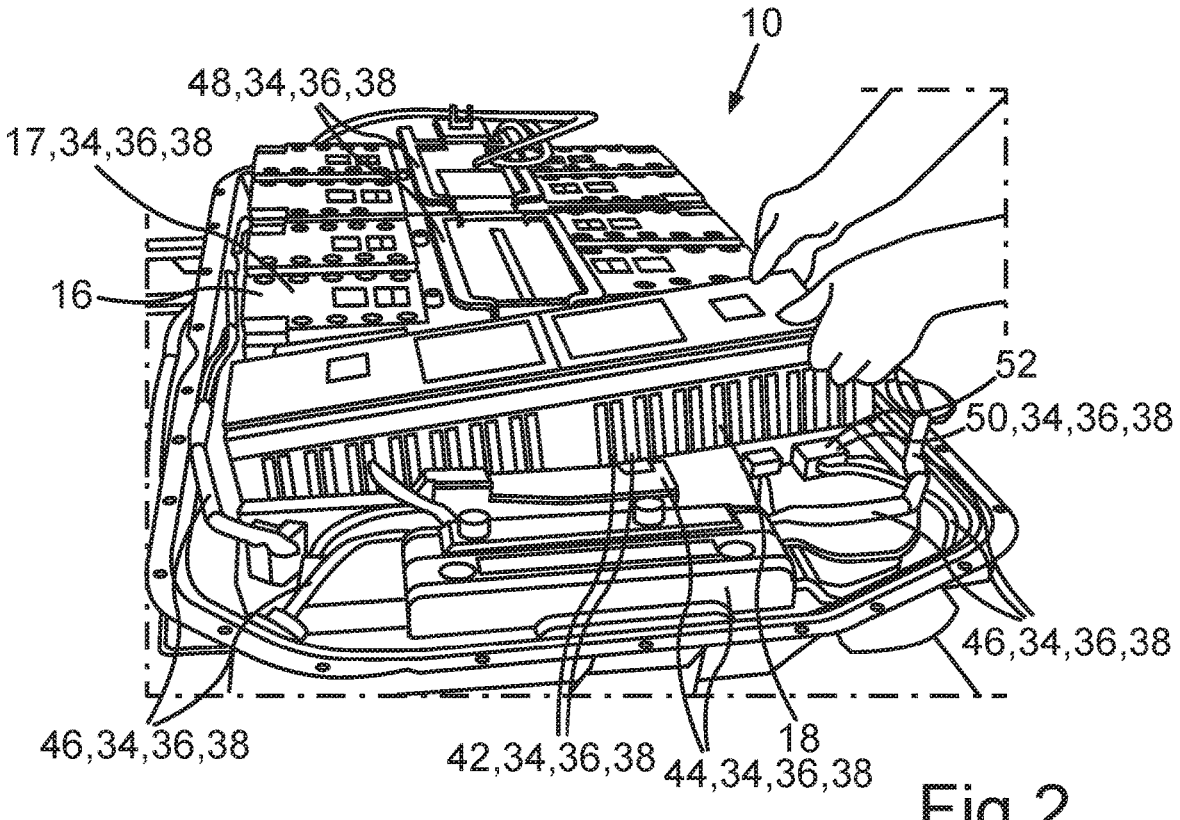
FIG. 2 shows a schematic representation of an energy storage device according to a further exemplary embodiment of the invention.

FIG. 2 shows a schematic illustration of an energy storage device 10 according to a further exemplary embodiment of the invention. This can basically be designed as described for FIG. 1, only the design of the interior of the housing 12 and the battery modules 16 are slightly different. It can be seen here, for example, that the battery cells 18 are electrically and thermally insulated from one another by cell separating elements 42, which can also represent such a component made of a plastic material 36 with a superabsorbent material 38. Such a component 34 can also be represent by the following components: cover and cladding components 44, cable sheaths 46, in which in particular a plurality of individual cables are routed, handles 48 on the battery modules 16 for handling the battery modules during assembly, insulation 50 or housings 50 of luster terminals 52 or contacting units 52 for electrically connecting electrical conductors, and so on.

Figure 3:
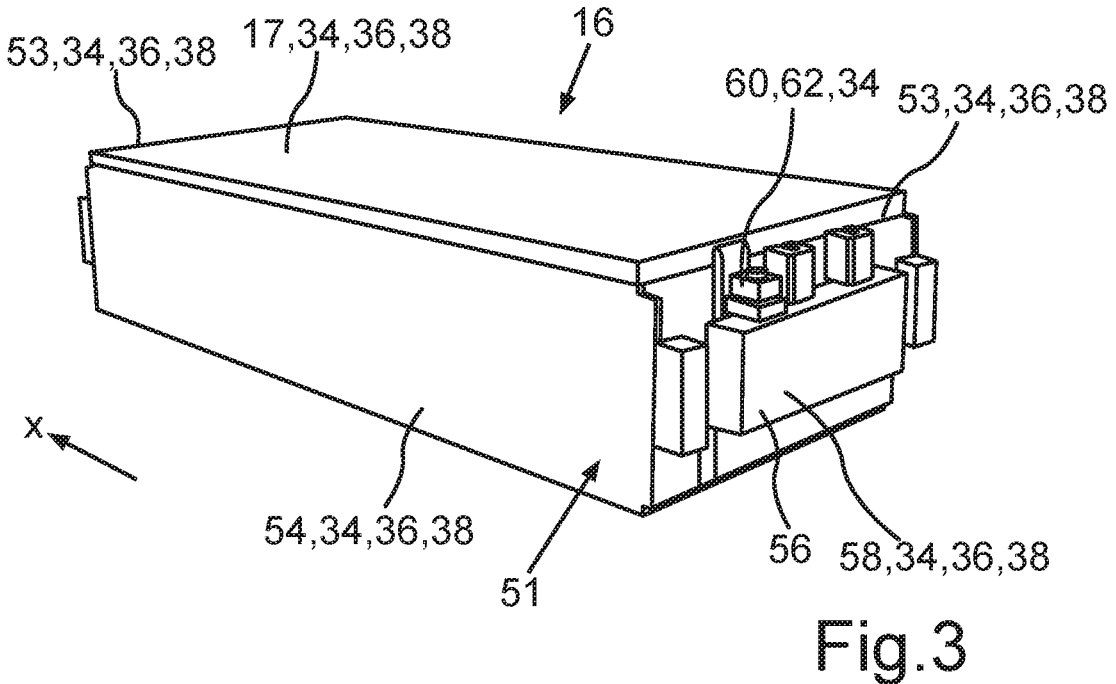
FIG. 3 shows a schematic representation of a battery module for an energy storage device according to an exemplary embodiment of the invention.

FIG. 3 shows a schematic representation of a battery module 16 for an energy storage device 10 according to an exemplary embodiment of the invention. As described, the battery module 16 has a cover 17 which can also be designed as such a component 34 with a superabsorbent material 38. In addition, it can also be seen in this illustration that the module 16 includes a module housing 51. This has, for example, two end plates 53 that delimit the module 26 in and against the stacking direction x. These can be braced against one another with side plates 54 or a closed tightening strap running all the way round. A cell module controller 56, which also has a housing 58, is also arranged on one of the end plates 53. In addition, a module connection or high-voltage connection 60 and its insulation 62 are also shown in the region of one of the end plates 53. All of these components made of plastic materials can also represent the component 34 with a superabsorbent material 38.

Figure 4:
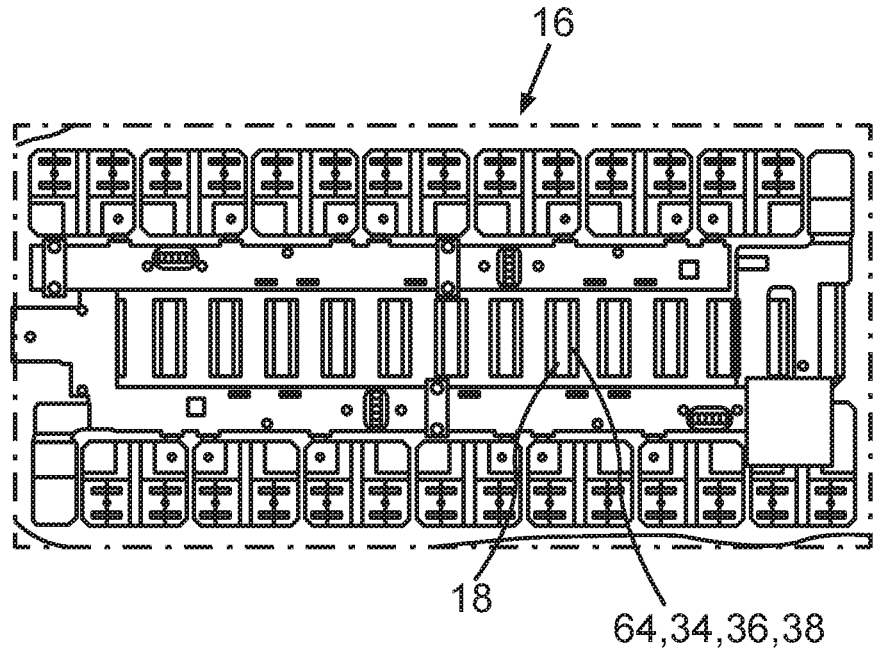
FIG. 4 shows a schematic representation of a battery module for an energy storage device according to an exemplary embodiment of the invention.

FIG. 4 shows a schematic representation of a battery module 16 according to an exemplary embodiment of the invention. The cell housings of the cells 18 can be encased by electrical insulation 64, which can also be provided as a component with a superabsorbent material 38. These plastic parts 34 do not have to be made 100 percent from the superabsorbent material 38, which is nevertheless possible in principle, but it is also possible and preferred to mix the superabsorbent material 38, provided for the engineering plastic material 36, from which these components 34 are made, with common engineering plastic materials and to make them available, for example, as a so-called blend. In this way, the superabsorbent material 38 can be integrally mixed with other engineering plastics to provide the plastic material 36. All desired or relevant properties, for example thermal conductivity, electrical conductivity, mechanical properties, temperature stability, creep behavior, and so on, swelling behavior in contact with water, can be set in a targeted manner by means of the plastic mixture. Thus, in order to provide components 34 with superabsorbent properties, no additional components are required, but these components can be formed as usual, but from a different plastic material 36 than hitherto customary, which at least partially includes a superabsorbent polymer.

Overall, the examples show how the invention can be used to provide super absorbers as a structural plastic material within a high-voltage battery. The big advantage in this case is that super absorbers, which would have to be added with extra weight and installation space, are now used synergistically through plastic engineering materials, which results in weight and package savings. Another advantage is that the introduced superabsorbent material reduces humidity inside the battery. In addition, any penetrating water would be absorbed in the event of a leak. The safety of the energy storage device can thus be significantly increased in a simple and cost-effective manner without requiring additional weight or installation space.

The invention claimed is:

1. An energy storage device for a motor vehicle with a protective device for protecting at least one battery cell of the energy storage device, wherein the energy storage device comprises
   at least one component made of a plastic material, wherein the component is part of the protective device and the plastic material comprises a superabsorbent material, so that the at least one component is configured to perform both a primary function and absorption of liquid.

2. The energy storage device according to claim 1, wherein the plastic material is provided as an integral connection of the superabsorbent material with at least one plastic material different from a superabsorbent material having homogeneous material properties.

3. The energy storage device according to claim 2, wherein the plastic material comprises at least one plastic material that is different from a superabsorbent material and comprises a polymer blend or a polymer alloy.

4. The energy storage device according to claim 2, wherein the at least one component comprises a deep-drawn component.

5. The energy storage device according to claim 2, further comprising:
   multiple battery cells, wherein the at least one component is arranged between at least two of the multiple battery cells, as a cell separating element the multiple battery cells are arranged next to one another in a stacking direction to form a cell stack, the energy storage device comprises multiple components of the at least one component, one component of the multiple components is arranged as a respective cell separating element between every two battery cells of the multiple battery cells arranged adjacent in the stacking direction.

6. The energy storage device according to claim 2, wherein the energy storage device has at least one of the following components and the component as at least part of at least one of the components:

a battery housing in which multiple battery modules each having multiple battery cells are arranged;

a module housing of a battery module in which multiple battery cells contained by the energy storage device are arranged;

a tensioning device for tensioning a cell stack comprised by the battery module of multiple battery cells stacked in a stacking direction;

at least one of two end plates of the tensioning device and/or a tensioning strap of the tensioning device;

a housing of an electronic component which is arranged on one of the end plates of the module housing;

a component housing which differs from the battery housing and from the module housing;

a holder or a handle on one or more battery modules;

a cable holder and/or a cable tie and/or a cable sheathing, which encloses multiple cables;

a fastening element;

a protection against contact comprising a cell connector, a pole terminal, and a module connector;

a protective cover;

a spacer;

a sheathing component;

a battery switching unit;

an insulating element for electrically insulating a first component from an environment or from a second component, the first component comprises a cell pole or a cell connector or a module connector, and the second component comprises part of the battery housing or of a cooling device.

7. The energy storage device according to claim 1, wherein the plastic material comprises at least one plastic material that is different from a superabsorbent material and comprises a polymer blend or a polymer alloy.

8. The energy storage device according to claim 7, wherein the at least one component comprises a 3D printed component.

9. The energy storage device according to claim 7, further comprising:

multiple battery cells, wherein the at least one component is arranged between at least two of the multiple battery cells, as a cell separating element, the multiple battery cells are arranged next to one another in a stacking direction to form a cell stack, the energy storage device comprises multiple components of the at least one component, and one component of the multiple components is arranged as a respective cell separating element between every two battery cells of the multiple battery cells arranged adjacent in the stacking direction.

10. The energy storage device according to claim 7, wherein the energy storage device has at least one of the following components:

a battery housing in which multiple battery modules each having multiple battery cells, are arranged;

a module housing of a battery module in which multiple battery cells contained by the energy storage device are arranged;

a tensioning device for tensioning a cell stack comprised by the battery module of multiple battery cells stacked in a stacking direction;

at least one of two end plates of the tensioning device and/or a tensioning strap of the tensioning device;

a housing of an electronic component which is arranged on one of the end plates of the module housing;

a component housing which differs from the battery housing and from the module housing;

a holder or a handle on one or more battery modules;

a cable holder and/or a cable tie and/or a cable sheathing, which encloses multiple cables;

a fastening element;

a protection against contact comprising a cell connector, a pole terminal, and a module connector;

a protective cover;

a spacer;

a sheathing component;

a battery switching unit;

an insulating element for electrically insulating a first component from an environment or from a second component, the first component comprises a cell pole or a cell connector or a module connector and the second component comprises a part of the battery housing or of a cooling device.

11. The energy storage device according to claim 1, wherein the plastic material is provided entirely by the superabsorbent material.

12. The energy storage device according to claim 11, wherein the at least one component comprises a pressed component.

13. The energy storage device according to claim 11, further comprising:

multiple battery cells, wherein the at least one component is arranged between at least two of the multiple battery cells, as a cell separating element, the multiple battery cells are arranged next to one another in a stacking direction to form a cell stack, the energy storage device comprises multiple components of the at least one component, and one component of the multiple components is arranged as a respective cell separating element between every two battery cells of the multiple battery cells arranged adjacent in the stacking direction.

14. The energy storage device according to claim 1, wherein the at least one component comprises an injection molded component.

15. The energy storage device according to claim 14, further comprising:

multiple battery cells, wherein the at least one component is arranged between at least two of the multiple battery cells, as a cell separating element, the multiple battery cells are arranged next to one another in a stacking direction to form a cell stack, the energy storage device comprises multiple components of the at least one component, and one component of the multiple components is arranged as a respective cell separating element between every two battery cells of the multiple battery cells arranged adjacent in the stacking direction.

16. The energy storage device according to claim 1, further comprising:

multiple battery cells, wherein the at least one component is arranged between at least two battery cells of the multiple battery cells, as a cell separating element, the multiple battery cells are arranged next to one another in a stacking direction to form a cell stack, the energy storage device comprises multiple components of the at least one component, and one component of the multiple components is arranged as a respective cell separating element between every two battery cells of the multiple battery cells arranged adjacent in the stacking direction.

17. The energy storage device according to claim 1, wherein the energy storage device has at least one of the following components:

a battery housing in which multiple battery modules, each having multiple battery cells are arranged;

a module housing of a battery module in which multiple battery cells contained by the energy storage device are arranged;

a tensioning device for tensioning a cell stack comprised by the battery module of multiple battery cells stacked in a stacking direction;

at least one of two end plates of the tensioning device and/or a tensioning strap of the tensioning device;

a housing of an electronic component which is arranged on one of the end plates of the module housing;

a component housing which differs from the battery housing and from the module housing;

a holder or a handle on one or more battery modules;

a cable holder and/or a cable tie and/or a cable sheathing, which encloses multiple cables;

a fastening element;

a protection against contact on a cell connector, pole terminal, module connector;

a protective cover;

a spacer;

a sheathing component;

a battery switching unit;

an insulating element for electrically insulating a first component from an environment or from a second component, the first component comprises a cell pole or a cell connector or a module connector, and the second component comprises part of the battery housing or of a cooling device.

18. The energy storage device according to claim 1, wherein the primary function comprises at least one of the following:

an electrically insulating function;

a protective function;

an enclosing function;

a holding or stabilizing function;

providing a minimum distance between two components of the energy storage device;

a function of cell separation of two battery cells, spatially, electrically, and thermally;

a fastening and/or fixing function;

a covering function.

19. A motor vehicle having the energy storage device according to claim 1.

20. A method for producing an energy storage device with a protective device for at least one battery cell of the energy storage device, wherein the energy storage device is produced with at least one component made of a plastic material, wherein the at least one component is produced as part of the protective device from a plastic material, which comprises a superabsorbent material, so that the at least one component is configured to perform both a primary function and absorption of liquid.

* * * * *